United States Patent [19]

Tanzawa et al.

[11] 3,896,061

[45] July 22, 1975

[54] SEMI-PERMEABLE MEMBRANES, THEIR PREPARATION AND THEIR USE

[75] Inventors: Hiroshi Tanzawa; Yoshitada Sakai, both of Kamakura; Takao Matsushita, Yuushudainishi; Yoshishige Fujii, Otsu; Kouji Sugita, Otsu; Haruki Maekawa, Otsu, all of Japan

[73] Assignee: Toray Industries, Inc., Tokyo, Japan

[22] Filed: Aug. 7, 1973

[21] Appl. No.: 386,388

[30] Foreign Application Priority Data
Aug. 16, 1972 Japan.............................. 47-81408
Feb. 17, 1973 Japan.............................. 48-188779

[52] U.S. Cl.......... 260/2.5 M; 260/29.6 RB; 264/49

[51] Int. Cl. ............................................. C08f 47/10
[58] Field of Search........ 260/29.6 RB, 29.6 B, 907, 260/2.5 M; 264/49; 210/294, 295, 22

[56] References Cited
UNITED STATES PATENTS
3,050,785  8/1962  Cunningham.................. 260/901 X

*Primary Examiner*—Lewis T. Jacobs

[57] ABSTRACT

Transparent hydrogels comprising isotactic polymethylmethacrylate and syndiotactic polymethylmethacylate make semi-permeable membranes of good strength and permeability which have particular utility in hemodialysis.

6 Claims, No Drawings

SEMI-PERMEABLE MEMBRANES, THEIR PREPARATION AND THEIR USE

FIELD OF THE INVENTION

This invention relates to semi-permeable membranes, their preparation and their use. More particularly, this invention relates to a novel transparent hydrogel type semi-permeable membrane comprising isotactic polymethylmethacrylate and syndiotactic polymethylmethacrylate and the preparation and use thereof in ultrafiltration and dialysis processes, particularly in the hemodialysis process.

DESCRIPTION OF THE PRIOR ART

Semi-permeable membranes are permeable to low molecular weight substances and impermeable, or of low permeability, to high molecular weight substances when they are brought into contact in a solution. Separation techniques which employ such membranes include dialysis, reverse osmosis, ultrafiltration, etc.

The most extensively used semi-permeable membranes are based on hydrophilic polymers such as cellulose derivatives, for example, cellulose esters and ethers, especially cellulose acetate. (See, for example, U. S. Pat. Nos. 3,133,132; 3,133,137; 3,170,867; 3,283,042; and 3,290,286). However, the semipermeable membranes of the prior art are of limited applicability in many separatory processes because of inherent disadvantages relating to their chemical stability, thermal stability, efficiency and length of life.

It is an object of the invention to provide a novel semi-permeable membrane, particularly well suited for hemodialysis, made from hydrophobic polymers which may be utilized to separate components of a solution.

It is also an object of the invention to provide a process for production thereof.

It is yet another object of this invention to provide an improved process for separating the components of an aqueous solution utilizing the resulting semi-permeable membrane.

SUMMARY OF THE INVENTION

It has been found that a semi-permeable membrane comprising isotactic polymethylmethacrylate and syndiotactic polymethylmethacrylate has utility as a transparent hydrogel. The resulting semi-permeable membrane may be utilized in the form of thin sheet or hollow fiber to separate components of a solution, for example, to remove undesirable microsolutes from blood. A semi-permeable membrane of the invention is produced by the steps of a. dissolving isotactic polymethylmethacrylate and syndiotactic polymethylmethacrylate in a solvent capable of dissolving said polymers to prepare a sol;

b. lowering the temperature of the sol to the temperature sufficient for the system to be transformed to the gel phase; and c. replacing the solvent in the gel with water, whereby a hydrogel type semi-permeable membrane having high water content is obtained.

DESCRIPTION OF PREFERRED EMBODIMENTS

The polymeric material utilized to form the semipermeable membrane of the present invention is a so called stereo complex of isotactic polymethylmethacrylate (hereinafter polymethylmethacrylate is referred to as PMMA) and syndiotactic PMMA.

A solution wherein isotactic PMMA and syndiotactic PMMA coexist exhibits a thermally reversible phase transition, due to the interaction of the two kinds of polymer structures. A solution system comprising isotactic PMMA, syndiotactic PMMA and a organic solvent is cooled to the point where the sol phase is converted into a gel phase by the physical crosslinking of the molecular chains. Then all the organic solvent existing therein is replaced with water by contacting the gel with water, which results in the final hydrogel type semi-permeable membrane having high water content, usually 10 – 90% by weight, and having high transparency.

The membrane is preferably 10 to 100 $\mu$ thick and may be prepared in the form of a thin sheet of film, or in the form of a tube, or hollow fiber. A preferred hollow fiber would have an outer diameter of about 25 to 800 $\mu$.

The tacticities of polymers used in the present invention may be determined from a "triad," i.e. the structural configuration of any three adjacent monomer units along the molecular chains of the polymer, using NMR spectrum. The preferable PMMA materials to be used in the present invention satisfy the following equations wherein I is the percent of triad isotactic structures, S is the percent of triad syndiotactic structures and H is the percent of triad heterotactic structures:

$$0.1 < I/S < 10$$

(more preferably, $$0.2 < I/S < 5)$$

$$I + S > H$$

Other monomers may be used as long as PMMA components existing in the polymer material satisfy the above equations and the solution of the polymeric material exhibits sol-gel phase transitions. Useful PMMA preferably also has a molecular weight of more than 100,000.

The solvents used in the present invention are usually selected from organic solvents having a solubility parameter between 8.5 and 13. Especially preferred are organic solvents compatible with water and having a solubility parameter between 9 – 13. Examples of the common useful organic solvents are dimethyl formamide, dimethyl sulfoxide, acetonitrile, acetic acid, acetone, methyl-ethyl ketone, tetrahydrofuran, nitromethane, acrylonitrile and mixtures thereof.

The solution dissolving isotactic PMMA and syndiotactic PMMA preferably contains about 5 to 50% of the polymers, by weight. The polymers are conveniently dissolved at temperatures of about 50°C to 120°C.

The sol may be formed into any desirable body, shape, or design suitable for use in the dialysis processes, such as a film, a tubular form, or a hollow fiber. This sol is placed in a suitable form or cast and this form is then cooled to a temperature sufficient to transform the sol into the gel, whereby the gel structure is set. The solvent present in the gel is then replaced with water by contacting the gel with water, whereby the hydrogel membrane is produced.

For example, a film or thin sheet membrane is prepared by casting the polymer solution onto a support, such as a glass plate or a metal plate, and then cooled and immersed with, or without, this support in water at a low temperature. The membrane may also be prepared by extruding the sol into a low temperature coagulating bath or into a low temperature gaseous fluid from a nozzle or slit, whereby gelation occurs, and thereafter treating the gel with water.

In each of the possible methods for casting the polymer solution, it is necessary to reduce the temperature to below the sol-gel phase transition point. The sol-gel phase transition temperature or the melting point of the gel is different according to the characteristics of PMMA and solvent used and the concentrations thereof, but are usually in the range of about 30° – 90°C. At temperatures in the vicinity of the melting point of the gel, gelation will occur. It is preferable, however, that the temperature is reduced to at least 50°C lower than the melting point of the gel. Usually gelation is more preferably carried out by using water of 0° – 5°C.

The gelated body is subjected to water treatment, whereby the gel structure is fixed and the solvent present in the gel is replaced with water. The water treatment is preferably carried out by first immersing the gel in water having in it components more compatible with the polymer, such as the same organic solvent as the organic solvent used in preparation of the polymer solution, and then by immersing it in water only. The resulting hydrogel type semi-permeable membrane retains considerable water therein and exhibits high transparency, good strength and improved permeability.

One of the characteristics of a membrane of this invention is that the molecular weight cut-off level of the membrane may be varied over a wide range. The molecular weight cut-off level refers to the value of molecular weight at which 50% of the molecules in contact with the membrane will be rejected from passage therethrough. The molecular cut-off level corresponds mainly to the water content of the gel. Therefore, many kinds of the membranes having different intrinsic molecular weight cut-off levels can be made by preparing membranes having different levels of water content.

The water content of a membrane of this invention may be changed by the following preferred methods:
1. By changing the concentration of the polymers in the solution, since an increase in the polymer concentration causes a decrease in water content;
2. By changing the ratio of the tacticities of the polymers and the temperature of the gelation;
3. By subjecting the membrane to a heat treatment in water or in other nonsolvent;
4. By subjecting the gel to a partial desolvation prior to the water replacement;

Other characteristics of a membrane of this invention are as follows:
1. Very high ultrafiltration ratio,
2. Good efficiency in dialysis of solute,
3. Biologically inactive,
4. Non-absorptive for water soluble compounds, and
5. Moderate mechanical properties.

A particularly preferred embodiment of a membrane of this invention is prepared in the form of a hollow fiber. Accordingly, we shall describe in detail the hollow fiber embodiment. The preferred method of making the hollow fiber comprises extruding the polymer solution, at a temperature above the melting point of the gel, from a spinneret into a gaseous fluid, whereby the polymer is gellated by cooling, and subsequently bringing the gel into a chilled coagulating bath, and then, in a subsequent process, substituting water for the solvents in the coagulating gel of the hollow fiber.

The spinneret which may be used in the present invention is a conventional type, having an annular extrusion orifice and an inner tube therein which is coaxially oriented within the annular orifice. Through the inner tube suitable fluid can be injected into the hollow fiber. The spinneret is preferably oriented in a downward direction, so that the hollow fiber can thereby descend vertically into the coagulating bath. The temperature at which the solution of the polymer mixture is spun is usually 5°C or 30°C higher than the melting point of the gel of the solution.

Where the extruded hollow fiber shaped solution is brought into contact with a gaseous fluid and gellation is thereby accomplished, the gaseous fluid generally comprises air and the vapors of solvents of a coagulating liquid, although other inert gases can also be used in place of air or the vapors. The temperature of the vapor should be at least 20° lower than the melting point of the gel and a much lower temperature is preferable for making transparent or opalescent hollow fiber hydrogel. It is also advantageous and beneficial for the distance of exposure to the cooling gaseous fluid to be from about 10 cm to 200 cm and, preferably, from 20 cm to 50 cm.

Where coagulation is carried out using a chilled coagulating liquid, this liquid should be maintained at a temperature below 20°C. The coagulating liquid is comprised of a non-solvent for the polymer, or a solution of the non-solvent containing substantially the same solvent as the polymer solution. In typical cases, the solvent for the polymer may be selected from water soluble solvents and the non-solvent is water.

In a conventional method for making hollow fiber, the fluid vapor or coagulating liquid may be injected or aspirated into the hollow fiber formed by a spinneret through the inner tube centered in the annular orifice. The fluid vapor is often injected into melt spun hollow fiber, while a coagulating liquid is often adopted in the case of solution spinning. However, hollow fibers according to the present invention cannot be made by injecting a coagulating liquid, although the present invention comprises solution spinning, because the transparency and the semi-permeability of the hollow fiber membrane is lost when a hollow fiber shaped solution is brought into contact with a coagulating liquid before gellation is accomplished by cooling.

The preferable injection liquid consists of a solution of substantially the same solvent as contained in the polymer solution and a quantity of a solvent selected from the group consisting of glycerine, ethylene glycol, diethylene glycol, triethylene glycol and other polyols. The amount of the latter solvent in the injection liquid has a significant influence on the ability to spin and on the permeability of hollow fiber prepared in accordance with invention. Generally a superior ability to spin and adequate permeability is observed when a polyol is added to the solution so that the concentration therein is from 1 to 50% by weight, and the preferable concentration therein is from 5 to 20% by weight. Such an injecting liquid has less coagulating effect on the polymer solution and the desired transparency and/or opalescent of the hollow fiber membrane can be achieved. Of course, a gaseous fluid may also be employed in the present invention without diminishing transparency and/or decreasing semi-permeability resulting from uniform wall thickness and fiber diameter of the hollow fiber, so as to render fiber so spun inferior to the hollow fiber made in accordance with the forgoing method utilizing an injecting liquid.

According to the present invention, hollow fibers having a diameter of from $25\mu$ to $800\mu$ can be easily spun and such fibers show superior permselectivity, especially high permeability to water and other small molecular weight substances, similar to that exhibited by the sheet membranes. Other characteristics include uniformity of wall thickness and outside diameter, and the shape of the cross section is also uniformly round. Furthermore, the fiber has high burst strength and the shape of the hollow fiber is not easily changed in the process of replastizating and/or mounting to the fluid separation apparatus. These characteristics are very beneficial for use in hemodialysis, ultrafiltration, reverse osmosis, and for separation processes.

In the dialysis operation using a membrane of this invention, the liquid to be dialyzed passes along the one side of the membrane, whereupon contact therewith the dialyzable components of the liquid pass through the membrane into the solvent in contact with the other side of the membrane. In hemodialysis, this solvent is typically an aqueous solution of salt, and glucose, the concentrations of which are selected to achieve the desired salt concentration in the blood, as well as to dissolve certain microsolutes such as urea, creatinine, and the like. The dialyzed liquid is collected separately from the dialysate.

EXAMPLE 1

A mixture of 5 parts of syn-PMMA-1 and 1 part of iso-PMMA-1 was dissolved into 34 parts of diemethyl sulfoxide (DMSO) at 120°C, where syn-PMMA-1 is syndiotactic polymethylmethacrylate obtained by an ordinary radical polymerization process and has a molecular weight of 660,000, and iso-PMMA-1 is isotactic polymethylmethacrylate obtained by a "Grignard's" process and has a molecular weight of 1,450,000. The tacticity of this mixture of PMMA expressed by triads was as follows:

I = 27%
S = 45%
H = 28%

The viscosity of the DMSO solution of PMMA was 10 poise. When the solution was cooled, it formed a gel. The sol-gel transition temperature was 70°C and it was recognized that the sol-gel transition was reversible.

The solution was poured onto a glass plate at 120°C, thereby forming a thin film having a thickness of $125\mu$, and then it was cooled at room temperature until the gelation of the film was brought to completion. This thin film of gel was then immersed in an ice water bath, (0°C), whereby the DMSO in the gel film was replaced with water by mutual diffusion, and the hydrogel structure of PMMA was formed. The hydrogel film obtained thereby was washed with water several times and then stored in water, or in air after glycerin treatment.

The hydrogel film had a water content of 73%, it was completely transparent, and it provided excellent properties for use as a permselective membrane. Table I shows the observed values of the permeability of water and solute for a 0.5% aqueous solution of sodium chloride at 30°C. In the Table, hydrogel PMMA is the membrane of this invention, and "Cuprophane", whose values are shown for reference purposes, is a conventional commercial membrane made with regenerated cellulose.

Table 1

| PERMEABILITY COEFFICIENT | HYDROGEL PMMA | "CUPROPHANE" |
| --- | --- | --- |
| P1 (g$^{-1}$cm$^3$sec) | 4.7×10$^{-12}$ | 6.4×10$^{-14}$ |
| P2 (cm$^2$sec$^{-1}$) | 3.2×10$^{-6}$ | 8.8×10$^{-7}$ |

Where P1, the water permeability coefficient, and P2, the solute permeability coefficient, are defined by the following equations:

$$Jv = P1 \frac{\Delta P}{\lambda}$$

$$Js = P2 \frac{\Delta C}{\lambda}$$

Where Jv is the total volume flux, Js is solute flux, $\Delta P$ is the trans-membrane pressure, $\Delta C$ is the difference in trans-membrane concentration and $\lambda$ is the thickness of the membrane.

It is clearly seen from Table I that the permeability of the hydrogel PMMA membrane made by the process of this invention is excellent in comparison with "Cuprophane". The molecular weight cut-off level of the membrane of the invention was 40,000 and the membrane rejected bovine serum albumin completely.

The tensile strength at the breaking point and the ultimate elongation of the membrane of the invention were 50 kg/cm$^2$ and 40%, respectively.

The membrane was useful for hemodialysis, blood filtration, and the ultrafiltration and separation of water soluble macromolecules.

EXAMPLE 2

Different kinds of the membranes having various hydrogel structures were made by varying polymer concentration of the DMSO solution. The procedure for preparing a membrane of these samples was the same as in Example 1, except for polymer concentration utilized.

The results of evaluation for permeability are presented in Table II

Table II

| | | Values of permeability and molecular weight cut-off level for various hydrogel PMMA membranes | | | |
| --- | --- | --- | --- | --- | --- |
| SAMPLE NO. | POLYMER CONCENTRATION OF SOLUTION % | P1 WATER g$^{-1}$cm$^3$sec (×10$^{-12}$) | P2 NaCl cm$^2$sec$^{-1}$ (×10$^{-6}$) | P2 UREA cm$^2$sec$^{-1}$ (×10$^{-6}$) | MOLECULAR CUT-OFF LEVEL M.W. (×10$^{-3}$) |
| 101 | 15 | 4.7 | 3.2 | 3.0 | 24 |
| 102 | 20 | 2.0 | 2.9 | 2.9 | 20 |

Table II – Continued

Values of permeability and molecular weight cut-off level for various hydrogel PMMA membranes

| SAMPLE NO. | POLYMER CONCENTRATION OF SOLUTION % | P1 WATER $g^{-1}cm^3sec$ ($\times 10^{-12}$) | P2 NaCl $cm^2sec^{-1}$ ($\times 10^{-6}$) | P2 UREA $cm^2sec^{-1}$ ($\times 10^{-6}$) | MOLECULAR CUT-OFF LEVEL M.W. ($\times 10^{-3}$) |
|---|---|---|---|---|---|
| 103 | 30 | 1.2 | 2.8 | 2.8 | 13 |
| 104 | 35 | 0.44 | 2.3 | 2.0 | 9 |
| 105 | 40 | 0.29 | 1.0 | 1.1 | 5 |

EXAMPLE 3

Five parts of diemethyl sulfoxide (DMSO) 30% solution of syn-PMMA (average molecular weight $1.3 \times 10^5$), polymerized by a radical method, and 1 part of DMSO 30% solution of iso-PMMA (average molecular weight $4.2 \times 10^5$) were sufficiently mixed with each other at 120°C. Total tacticities of the PMMA of this solution were:

I = 30%
S = 44%
H = 26% and the viscosity of this solution was 20 poise at 120°C. The gel point of this solution was 75°C.

The solution was cast on a glass plate maintained at 90°C and a sheet membranes was formed and cooled rapidly to the ambient temperature and gellation was carried out. The gellated sheet membrane was then dipped into cold water and the solvent therein was substituted with pure water. The thickness of this membrane was 30 microns, the water content was 56% by weight based on the wet membrane, and the molecular weight cut-off level defined as the 50% rejection level was $1.5 \times 10^4$.

Setting this membrane on the so-called Kultype dialyzer, wherein the effective membrane area was 1,000 cm², and dialyzing plasma added urea and creatinine at a plasma flow rate of $70^{ml}$/min, a dialysate flow rate of $120^{ml}$/min and a trans-membrane pressure of 100mmHg. The following results were obtained:

| | |
|---|---|
| Ultrafiltration rate | $90^{ml}$/min |
| Urea dialysance | $39^{ml}$/min |
| Creatinine dialysance | $31^{ml}$/min |

As a reference, a cellophane membrane commonly used for hemodialysis was placed on the same dialyzer and dialysis was conducted under the same conditions, whereby the following results were obtained:

| | |
|---|---|
| Ultrafiltration rate | $12^{ml}$/min |
| Urea dialysance | $14^{ml}$/min |
| Creatinine dialysance | $11^{ml}$/min |

EXAMPLE 4

A polymer solution was prepared by dissolving 205.3g of syn-PMMA of an average molecular weight of $44 \times 10^4$ and 41.2g of iso-PMMA of an average molecular weight of $111 \times 10^4$ in 876g of DMSO, at 120°C for 20 hours.

A spinneret having an annular orifice of an internal diameter of 2.0 mm and into which projects a tube of an external diameter of 1.6 mm and of coaxial orientation, was positioned in the air at ambient temperature 28 mm above a coagulating bath of water at 25°C, with its axis vertically oriented.

A prepared polymer solution was maintained in the feed tank of the spinning machine at 120°C and the polymer solution passage from the feed tank to spinneret was maintained at 85°C.

The polymer solution was extruded from the spinneret vertically downward at a rate of 1.35cm³/minute, and a mixture of DMSO with glycerine, in a weight ratio of 80 to 20, was simultaneously injected through the centered tube of the spinneret into the extrudate at a rate of 1.55 cm³/minute.

After passing from the spinneret and through the air, which cooled the extruded polymer solution, the hollow fiber of the gelated solution descended vertically through the coagulating bath for a distance of about 1 meter. It was thereafter removed from this bath at a speed of 15 meters/minute, which was greater than the rate of extrusion thereof, such that the outside diameter of the final hollow fiber was less than that of the extrudate and then after washing continuously with pure water through several washing baths, an opalescent hydrogel-type hollow fiber of the invention was obtained.

A 30 cm long bundle of 30 hollow fibers, prepared according to the foregoing method, was mounted in a glass U-type by sealing the space between and around the fibers at both ends of the U with an epoxy resin. The ends of the hollow fibers extended slightly beyond the seal and were kept open.

The ability to permeate water or other substances was measured with this U-type apparatus by passing water through the interior of the fibers under constant flow and constant pressure through a fitting attached to one end of the fiber bundle. The ultrafiltration rate for this test was about $1.7 \times 10^{-3}$ ml/hr.mmHG. 10 cm-fiber and the rejection of albumin was 93.0%. The molecular cut-off level which is defined as the value of the molecular weight of 50% rejection, was also measured to be about 4,500 – 5,000.

These values indicated that the hollow fiber prepared according to this present invention was very superior to the other permselective membranes in the permeability of water and another low molecular weight substances.

EXAMPLE 5

Example 4 was repeated with the following modifications:

a. The concentration of the polymer solution was 18% and the polymer of solution consisted of the same polymer as in example 4;

b. the ratio of the syn-PMMA and the iso-PMMA was 4:1;

c. the injecting fluid was a mixture of DMSO with glycerine in a weight ratio of 95 to 5; and d. the coagulating liquid consisted of an aqueous DMSO solution having a 40% concentration of DMSO.

A bundle of 2000 hollow fibers, which was prepared according to the foregoing method and having a outside diameter of 330$\mu$, a wall thickness of 40$\mu$ and cut to a length of 20cm, was assembled into PMMA-tubing and sealed with epoxy resin in the space between and around the fibers at both ends, with care taken not to permit any epoxy resin to be admitted into the fibers by closing the ends of fibers with vaseline.

The ability to permeate water and other substances was measured with this apparatus and the ultrafiltration rate of water obtained was 1.6 l/hr at 100 mm Hg of trans-membrane pressure. Albumin was rejected at the rate of 85%, and the molecular cut-off level was about 2.3×10$^4$.

What is claimed is:

1. A hydrogel semi-permeable membrane which is comprised of isotactic polymethylmethacrylate and syndiotactic polymethylmethacrylate, having a molecular weight of more than 100,000, wherein the tacticity of the mixture of said isotactic polymethylmethacrylate and said syndiotactic polymethylmethacrylate is within the range of $$0.1 < I/S < 10$$

and $$I + S > H$$

wherein I is the percent of the isotactic structures expressed by triad, S is the percent of syndiotactic structures expressed by triad, and the means molecular weight of the polymers is more than 100,000.

2. The semi-permeable membrane of claim 1 wherein said membrane is in the form of a thin sheet.

3. The semi-permeable membrane of claim 1 wherein said membrane is in the form of a hollow fiber.

4. The semi-permeable membrane of claim 1 wherein the water content of said membrane is 10 – 90% by weight.

5. A method for preparing the semi-permeable membrane of claim 1 which comprises a. dissolving isotactic polymethylmethacrylate and syndiotactic polymethylmethacrylate, said polymers having a mean molecular weight of more than 100,000 in a solvent capable of dissolving said polymers to prepare a sol, said solution containing about 5 to 50% of said polymers by weight;

b. lowering the temperature of the sol to a temperature sufficient for the system to be transformed into a gel, and c. replacing the solvent within said gel with water by causing said gel to come into contact with water.

6. The method of claim 5 wherein the total concentration of said polymers in said sol is within the range of 5 to 50%, by weight.

* * * * *